No. 759,055. PATENTED MAY 3, 1904.
C. P. WING.
COMBINED TIRE AND CARRIAGE BOLT HOLDER AND CLAMP.
APPLICATION FILED SEPT. 14, 1903.
NO MODEL. 2 SHEETS—SHEET 1.

Witnesses:
H. S. Gaither
C. C. Cunningham

Inventor:
Charles P. Wing
by Chamberlin & Wilkinson
attys

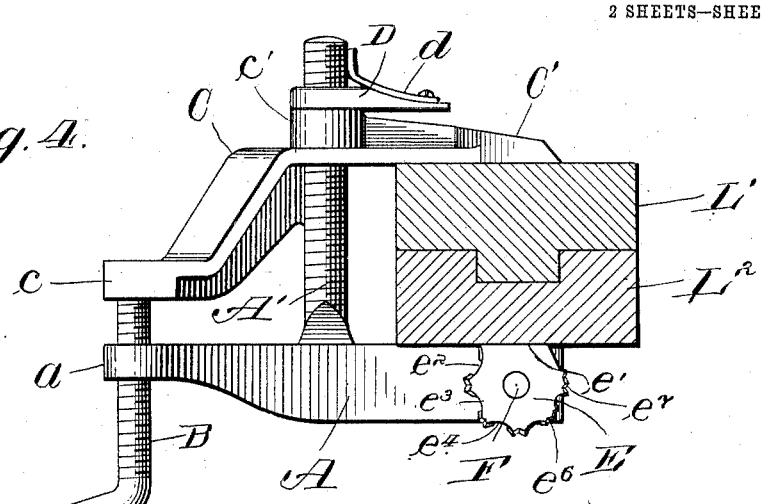
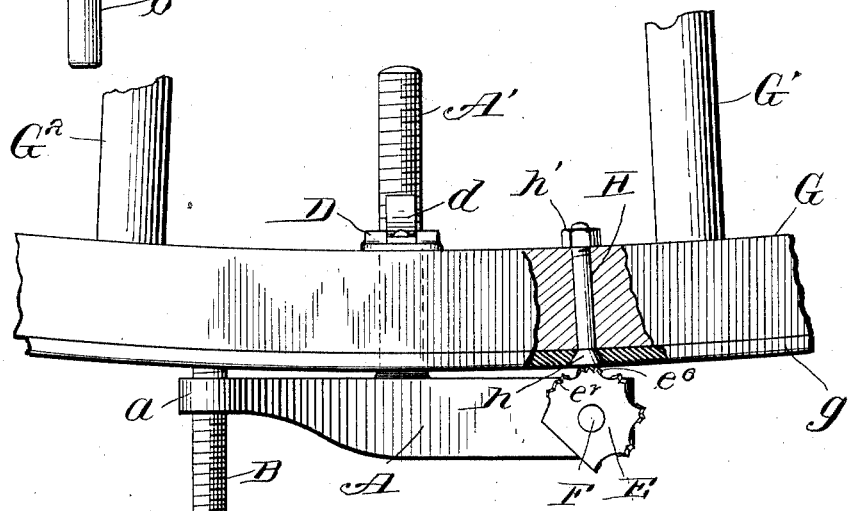
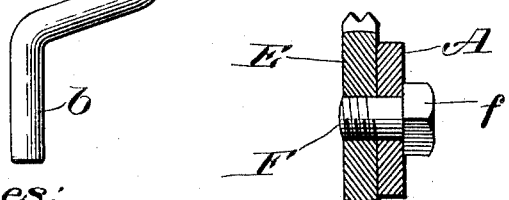

No. 759,055. Patented May 3, 1904.

UNITED STATES PATENT OFFICE.

CHARLES P. WING, OF HINSDALE, ILLINOIS.

COMBINED TIRE AND CARRIAGE BOLT HOLDER AND CLAMP.

SPECIFICATION forming part of Letters Patent No. 759,055, dated May 3, 1904.

Application filed September 14, 1903. Serial No. 173,071. (No model.)

*To all whom it may concern:*

Be it known that I, CHARLES P. WING, a citizen of the United States, residing at Hinsdale, county of Dupage, State of Illinois, have invented a certain new and useful Improvement in a Combined Tire and Carriage Bolt Holder and Clamp; and I declare the following to be a full, clear, and exact description of the invention, such as will enable others skilled in the art to which it pertains to make and use the same, reference being had to the accompanying drawings, which form a part of this specification.

My invention relates in general to combination-tools, and more particularly to a combined tire and carriage bolt holder and clamp.

Considerable difficulty is often experienced in screwing a nut on or off of a smooth-headed bolt—such, for instance, as a tire or carriage bolt—owing to the turning of the bolt when it is attempted to rotate the nut relative thereto.

The primary object of my invention is to provide a device which will engage the head of a bolt and prevent the same from rotating while the nut is being screwed on or off of the bolt.

A further object of my invention is to provide a combined tool adapted to non-rotatively hold the head of a tire or carriage bolt and also adapted for general use as a clamp.

A still further object of my invention is to provide a tool of the character referred to which will be simple in construction, inexpensive in manufacture, and efficient in use.

My invention, generally described, consists in a base, a screw-threaded rod rigidly connected at right angles to the base, a screw-threaded crank extending through one end of the base and located parallel to the screw-threaded rod, an adjustable gripping device supported at the other end of the base, a clamping member through the center of which the screw-threaded rod loosely passes and engaged at one end by the end of the crank-rod, and a nut engaging the screw-threaded rod to adjust the position of the clamping member with respect to the base.

My invention will be more fully described hereinafter with reference to the accompanying drawings, in which the same is illustrated as embodied in a convenient and practical form, and in which—

Figure 1:
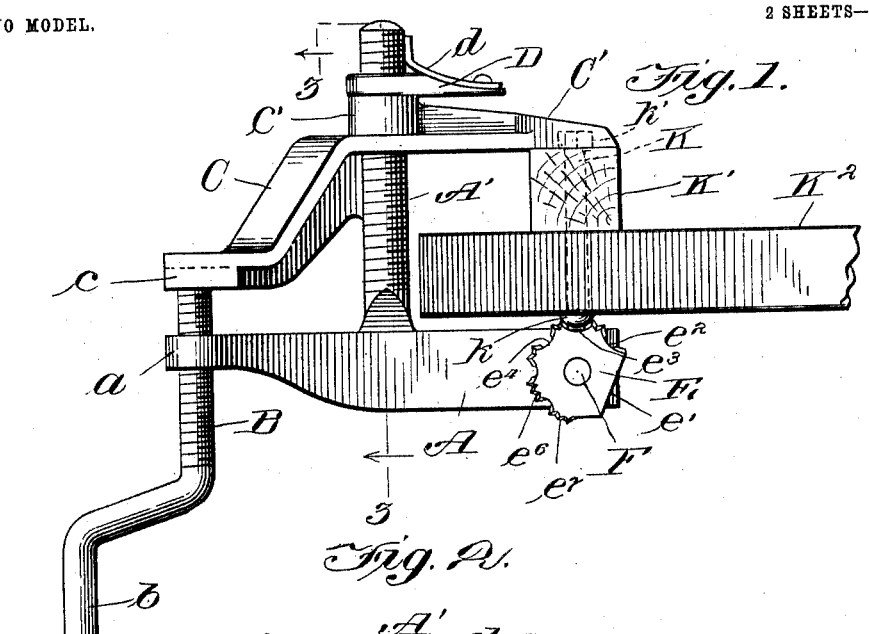
Figure 2:
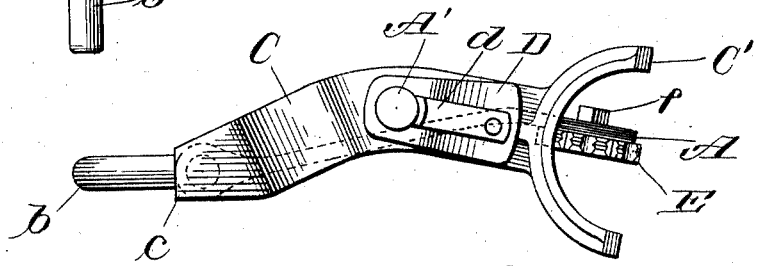
Figure 3:
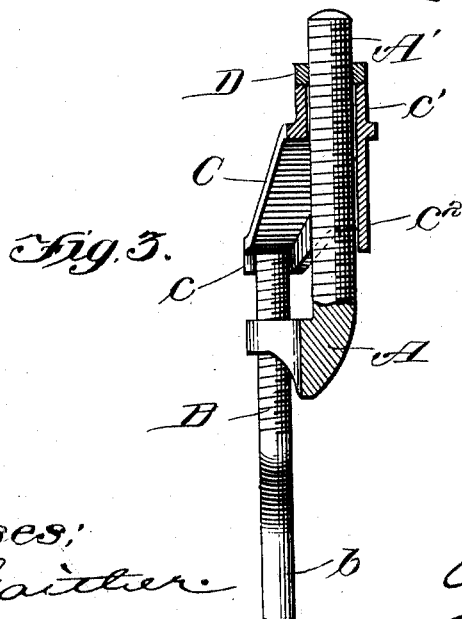

Figure 1 is an elevational view showing the device in use as a carriage-bolt holder; Fig. 2, a plan view of the device; Fig. 3, a vertical sectional view on line 3 3, Fig. 1; Fig. 4, an elevational view of the device in use as a clamp; Fig. 5, an elevational view showing the device in use as a tire-bolt holder, and Fig. 6 an enlarged detail sectional view through the gripping device.

The same reference characters are used to designate the same parts in the several figures of the drawings.

Reference-letter A designates a base-piece, to which is rigidly secured a screw-threaded rod A', which projects at right angles to the base.

B indicates a screw-threaded crank-rod extending through a screw-threaded boss $a$ at one end of the base A and provided with a crank-handle $b$.

E designates a gripping device adjustably secured to the opposite end of the base from the crank-rod B. The gripping device E is secured to the opposite side of the base from which the screw-threaded rod A' projects and is rotatable upon a short bolt F, which is provided with a head $f$, adapted to engage the opposite side of the base A from the device E, thereby tightly clamping the device E to the base A in any desired position. The gripping device E is provided with an irregular periphery comprising a flat face $e'$, curved recesses $e^2$, $e^3$, and $e^4$, having sharp projections at each side thereof, and roughened projections or points $e^6$ and $e^7$.

C designates a clamping member provided with a collar $c'$ near its center, through which loosely passes the screw-threaded rod A'. Depending below the boss $c'$ is a lug $c^2$, which lies adjacent to the screw-threaded rod A' and prevents the clamping member C from rocking laterally with respect to the screw-threaded rod. One end of the clamping member C is provided with a groove $c$ on its under surface, which receives the end of the screw-threaded crank-rod B. The end of the clamping member upon which the groove $c$ is formed is located nearer the base A than the portion of such clamping member which surrounds the screw-threaded rod A', thereby rendering it possible to employ a shorter crank-rod than would otherwise be necessary. The end C' of the clamping member is bifurcated, as clearly shown in Fig. 2, so as to engage a bar or other material at either side of the nut.

D indicates a tail-nut adjustably engaging the screw-threaded rod A' and serves as a stop to regulate the position of the clamping member C with respect to the base A. In order to retain the tail-nut D in adjusted positions, a spring $d$ is provided, which is rigidly secured to the tail-nut and frictionally engages the threads on the rod A'.

The operation and manner of using my invention is as follows: When it is desired to retain a carriage or other bolt against rotation while a nut is being screwed on or off thereof, the gripping device E is rotated to such a position that one of the recesses $e^2$, $e^3$, or $e^4$ engages the head $k$ of the carriage-bolt K. (See Fig. 1.) The recesses $e^2$, $e^3$, and $e^4$ are of different sizes, so as to tightly engage the various sizes of heads on the bolts, which are to be non-rotatively held. The clamping member C is adjusted with respect to the base A by means of the tail-nut D, so that the strips of material through which the bolt extends, as indicated at K' and K$^2$, will be received between the base A and clamping member. The crank-rod B is then rotated, so as to longitudinally oscillate the clamping member with respect to the rod A' and force the bifurcated end C$^2$ of the clamping member tightly against the strip K', thereby causing the head $k$ of the bolt K to be tightly held by the roughened points or projections at each side of the recess $e^3$ in the gripping device E. The nut $k'$ may then be turned on or off of the bolt by means of a wrench or other tool, access to the nut being permitted by reason of the portions of the bifurcated end C' of the clamping member engaging the strip K' at either side of the bolt. Any tendency of the clamping member C to move laterally about the rod A', owing to the portion of the clamping member through which the rod passes being offset with respect to its ends, is prevented by the lug $c^2$ engaging the rod A'.

When the device is to be used for clamping purposes generally, the straight face $e'$ on the periphery of the gripping device E' is turned upwardly, as shown in Fig. 4, so as to engage one surface of the material to be clamped—such, for instance, as the engaged strips L' and L$^2$—while the bifurcated end C' of the clamping member C engages the upper surface of the material. The clamping member is first adjusted with respect to the base A to receive the material to be clamped, after which the material is tightly gripped by rotating the crank-rod, and thereby oscillating the clamping member.

By reference to Fig. 5 the manner of using my invention for holding a tire-bolt will be readily understood. The gripping device E is first adjusted upon the base A by means of the bolt F, so that one of the roughened projections $e^6$ or $e^7$ will be in position to engage the head $h$ of the tire-bolt H. The tail-nut D is then adjusted so as to engage the inner surface of the felly G of the wheel, after which the crank-rod B is adjusted against the tire $g$, so as to force the roughened projections $e^6$ tightly against the head of the bolt. The nut $h'$ may then be rotated by means of a wrench either on or off of the bolt. In using the device for a tire-bolt holder the clamping member C is not necessary, as the tail-nut D serves to coöperate with the base A to receive the felly and tire of the wheel. Should one of the spokes of the wheel—such, for instance, as G' or G$^2$—be so near to the bolt that the tail-nut D cannot extend directly at right angles to the felly, it may be inclined and engage the felly at either side of the spoke.

From the foregoing description it will be observed that I have invented an improved combination-tool which may be readily used to engage the smooth head of a bolt—such, for instance, as a tire or carriage bolt—and prevent the same from rotating while the nut is being screwed on or off, and which may also be readily used as a clamp.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent, is—

1. In a tool of the character described, the combination with a base, of a screw-threaded rod secured thereto, a laterally-projecting member adjustably engaging the screw-threads on said rod, a screw-threaded crank-rod extending through said base, and a gripping device carried by said base.

2. In a tool of the character described, the combination with a base, of a screw-threaded rod rigidly secured to said base at one side thereof, a tail-nut adjustably engaging said rod and adapted to project laterally into alinement with said base, a screw-threaded crank-rod extending through said base, and a gripping device adjustably secured to said base.

3. In a tool of the character described, the combination with a base, of a screw-threaded rod rigidly secured thereto at one side thereof, a tail-nut in screw-threaded engagement with said rod and adapted to project laterally into alinement with said base, a friction-spring carried by said tail-nut engaging said rod to retain the nut in an adjusted position, a screw-threaded crank-rod extending through said base, and a gripping device adjustably secured to said base.

4. In a tool of the character described, the combination with a base, of a screw-threaded rod rigidly secured thereto, a clamping member through which said rod loosely passes, means for retaining said clamping member in adjusted positions upon said rod, a screw-threaded crank-rod extending through said base and engaging one end of said clamping member, and a gripping device carried by said base and located in alinement with said clamping member.

5. In a tool of the character described, the combination with a base, of a screw-threaded rod rigidly secured thereto, a clamping member through which said rod loosely passes, means for retaining said clamping member in adjusted positions upon said rod, a screw-threaded crank-rod extending through said base and engaging one end of said clamping member, a lug secured to said clamping member and extending adjacent to said rod for preventing lateral movement of said clamping member with respect to said rod, and a gripping device carried by said base and located in alinement with said clamping member.

6. In a tool of the character described, the combination with a base, of a screw-threaded rod rigidly secured thereto at one side thereof, a clamping member through which said rod extends, a tail-nut in screw-threaded engagement with said rod, a spring secured to said tail-nut for retaining the same in adjusted positions on said rod, a screw-threaded crank-rod extending through said base and engaging one end of said clamping member, the opposite end of said clamping member being bifurcated, and a gripping device carried by said base adapted to engage the head of a bolt the nut on which is received between the bifurcations of said clamping member.

7. In a tool of the character described, the combination with a base, of a rod rigidly secured thereto, a laterally-projecting member adjustably engaging said rod, and a gripping device rotatively mounted on said base and having recesses and projecting points on its periphery.

8. In a tool of the character described, the combination with a base, of a screw-threaded rod rigidly secured thereto, a clamping member through which said rod loosely passes and having one end thereof extending to a point adjacent to said base, means for retaining said clamping member in adjusted positions upon said rod, and a screw-threaded crank-rod extending through said base and engaging said end of the clamping member.

In testimony whereof I sign this specification in the presence of two witnesses.

CHARLES P. WING.

Witnesses:
   GEO. L. WILKINSON,
   CLARA C. CUNNINGHAM.